(12) United States Patent
Gupta et al.

(10) Patent No.: US 11,169,660 B2
(45) Date of Patent: Nov. 9, 2021

(54) PERSONALIZED ADAPTIVE TASK FRAMEWORK FOR USER LIFE EVENTS

(71) Applicant: Microsoft Technology Licensing, LLC, Redmond, WA (US)

(72) Inventors: Rahul Gupta, Saharanpur (IN); Bhavesh Sharma, Ludhiana (IN); Justin V. George, Hyderabad (IN); Kratu Beri, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 15/379,334

(22) Filed: Dec. 14, 2016

(65) Prior Publication Data

US 2018/0164959 A1   Jun. 14, 2018

(51) Int. Cl.
*G06F 3/0482* (2013.01)
*G06F 3/0481* (2013.01)
*G06Q 10/02* (2012.01)
*G06Q 10/10* (2012.01)

(52) U.S. Cl.
CPC ........ *G06F 3/0482* (2013.01); *G06F 3/04817* (2013.01); *G06Q 10/02* (2013.01); *G06Q 10/109* (2013.01)

(58) Field of Classification Search
CPC .... G06F 3/0482; G06F 3/04817; G06Q 10/02
See application file for complete search history.

(56) References Cited

U.S. PATENT DOCUMENTS

| 8,166,019 | B1 | 4/2012 | Lee et al. | |
|---|---|---|---|---|
| 8,386,929 | B2 | 2/2013 | Zaika et al. | |
| 8,560,371 | B2 | 10/2013 | Levitt | |
| 8,758,125 | B2 * | 6/2014 | Anderson | G07F 17/32 463/20 |
| 8,769,552 | B2 * | 7/2014 | Shaw | H04M 3/42153 719/318 |
| 8,781,870 | B2 | 7/2014 | Ward et al. | |
| 8,824,998 | B2 | 9/2014 | Balthasar et al. | |
| 9,143,460 | B2 | 9/2015 | Dhara et al. | |

(Continued)

OTHER PUBLICATIONS

Onorati, et al., "I Feel Lucky: an automated personal assistant for smartphones", In Proceedings of the International Working Conference on Advanced Visual Interfaces, May 21, 2012, 328-331 pages.

(Continued)

*Primary Examiner* — Shourjo Dasgupta
(74) *Attorney, Agent, or Firm* — Medley, Behrens & Lewis, LLC (57) ABSTRACT

Methods and systems for providing digital assistance. One system includes at least one electronic processor configured to access data representing historical tasks performed by a user through at least one user device, determine, based on the data, a first plurality of tasks associated with a life event of the user, and store an association between the first plurality of tasks and the life event. The electronic processor is also configured to, in response to a current occurrence of the life event experienced by the user, retrieve the association and generate a user interface for display to the user, the user interface including a second plurality of tasks for addressing the current occurrence of the life event based on the first plurality of tasks.

20 Claims, 8 Drawing Sheets

(56) References Cited

U.S. PATENT DOCUMENTS

| | | | |
|---|---|---|---|
| 9,201,952 B1* | 12/2015 | Chau | G06F 17/30867 |
| 9,245,225 B2 | 1/2016 | Winn et al. | |
| 9,318,108 B2 | 4/2016 | Gruber et al. | |
| 9,408,182 B1* | 8/2016 | Hurley | H04L 67/20 |
| 9,672,717 B1* | 6/2017 | Slavin | G08B 21/18 |
| 10,104,509 B2* | 10/2018 | Somer | H04M 1/72454 |
| 10,366,341 B2* | 7/2019 | Weber | G06N 20/00 |
| 10,432,841 B2* | 10/2019 | Wexler | H04N 5/23258 |
| 10,719,122 B2* | 7/2020 | Marti | G06F 3/011 |
| 2002/0016729 A1* | 2/2002 | Breitenbach | G06Q 10/08 707/802 |
| 2011/0106736 A1 | 5/2011 | Aharonson et al. | |
| 2011/0209181 A1* | 8/2011 | Gupta | H04N 7/163 725/62 |
| 2012/0271676 A1 | 10/2012 | Aravamudan et al. | |
| 2013/0346922 A1* | 12/2013 | Shiplacoff | G06F 3/04842 715/835 |
| 2014/0019975 A1* | 1/2014 | Schmidt | G06Q 10/10 718/100 |
| 2014/0035949 A1 | 2/2014 | Singh et al. | |
| 2014/0067455 A1* | 3/2014 | Zhang | G06Q 10/109 705/7.24 |
| 2014/0068475 A1* | 3/2014 | Li | G06F 3/0483 715/765 |
| 2014/0114699 A1* | 4/2014 | Amigo | A61B 5/1115 705/4 |
| 2014/0172313 A1* | 6/2014 | Rayner | G16H 20/60 702/19 |
| 2014/0215077 A1* | 7/2014 | Soudan | H04L 47/11 709/226 |
| 2014/0379273 A1* | 12/2014 | Petisce | G08C 17/02 702/19 |
| 2015/0006290 A1* | 1/2015 | Tomkins | G06Q 30/0261 705/14.54 |
| 2015/0044648 A1* | 2/2015 | White | A43B 3/0005 434/236 |
| 2015/0065237 A1* | 3/2015 | Hohn | H04W 4/029 463/29 |
| 2015/0142785 A1* | 5/2015 | Roberts | G06F 16/24578 707/723 |
| 2015/0153929 A1* | 6/2015 | Bernstein | G06F 3/0481 715/781 |
| 2015/0169659 A1* | 6/2015 | Lee | G06Q 10/10 707/746 |
| 2015/0186155 A1 | 7/2015 | Brown et al. | |
| 2015/0242753 A1* | 8/2015 | Yarlagadda | G06Q 30/0631 705/26.7 |
| 2015/0288569 A1* | 10/2015 | Agarwal | H04L 41/12 709/224 |
| 2015/0324751 A1* | 11/2015 | Orenstein | G16H 20/30 702/3 |
| 2016/0055236 A1* | 2/2016 | Frank | G06Q 30/02 707/748 |
| 2016/0110659 A1* | 4/2016 | Skeen | G06Q 10/02 705/5 |
| 2016/0136882 A1* | 5/2016 | Cobbett | A61B 5/02416 156/218 |
| 2016/0164975 A1* | 6/2016 | Seo | G16H 20/30 707/737 |
| 2016/0170996 A1* | 6/2016 | Frank | G06F 16/24578 707/748 |
| 2016/0170998 A1* | 6/2016 | Frank | G06F 16/24578 707/748 |
| 2016/0292269 A1* | 10/2016 | O'Driscoll | G06F 16/683 |
| 2016/0321573 A1 | 11/2016 | Vangala et al. | |
| 2017/0098159 A1* | 4/2017 | Sharifi | G06N 20/00 |
| 2017/0178034 A1* | 6/2017 | Skeen | G06F 17/30389 |
| 2017/0277396 A1* | 9/2017 | Chung | G06F 3/04817 |
| 2017/0323368 A1* | 11/2017 | Eastman | G06F 16/9537 |
| 2017/0329933 A1* | 11/2017 | Brust | G06F 16/252 |
| 2018/0109920 A1* | 4/2018 | Aggarwal | H04L 41/22 |
| 2018/0129971 A1* | 5/2018 | Vlassis | G06N 20/00 |
| 2018/0260081 A1* | 9/2018 | Beaudoin | G06F 3/0482 |

OTHER PUBLICATIONS

"International Search Report and Written Opinion Issued in PCT Application No. PCT/US2017/065209", dated Feb. 28, 2018, 12 Pages.

* cited by examiner

PERSONALIZED ADAPTIVE TASK FRAMEWORK FOR USER LIFE EVENTS

FIELD

Embodiments of the invention relate to digital assistants, and, more particularly, to digital assistants configured to generate a personalized grouping of suggested tasks for addressing a life event experienced by a user based on historical tasks performed by the user.

BACKGROUND OF THE INVENTION

Electronic personal assistants, such as Cortana® provided by Microsoft Corporation, Alexa® provided by Amazon.com, Inc., Siri® provided by Apple Inc., and Google Now® provided by Google Inc., exist in many forms and are provided through many types of electronic devices, including, for example, wearable smart devices, speakers, smart telephones, tablets, laptops, and servers. An electronic personal assistant may provide generic suggestions for a user without receiving a specific user request, such as by suggesting movies, restaurants, or other events based on user preferences or availability. Alternatively or in addition, an electronic personal assistant may provide a user with suggestions in response to a user request, such as providing suggestions for transportation options or routes, lodging locations and availability, restaurant locations and types, and the like. For example, a user may request suggestions for restaurants near a specific location, and the electronic personal assistant may use the location to identify and provide a set of restaurants, which the user can review. In some embodiments, when the user selects one of the suggested restaurants, the electronic personal assistant also automatically assists the user with making a reservation at the selected restaurant or booking transportation to the selected restaurant. This assistance may be provided as a dedicated service or as part of a search engine or another software component or service.

SUMMARY

When providing assistance, electronic personal assistants may focus on one specific task or request. However, in many situations, a user may perform a set of related tasks occurring over a period of time that are associated with an event or situation occurring in the user's life (referred to as a "life event" herein). For example, a life event may include responding to an emergency or an unexpected change in plans (for example, picking up a sick child from school or taking a family member to an unplanned medical consultation or procedure), planning for and taking a business trip, planning for and participating in a weekly team meeting, or the like.

Thus, embodiments of the invention provide systems and methods for providing personalized assistance for performing a group of related tasks that, in combination, help respond to a life event, plan for a life event, or both ("addressing" a life event). In particular, embodiments of the invention may identify associations between life events and tasks for a user based on the user's task history and, optionally, the task history for other users. The association may take the form a graph (referred to herein as a "task graph") that represents relationships between individual tasks associated with a particular life event. The association is stored and retrieved when a future occurrence of the life event is detected. The association is then used to create a user interface (also referred to as a "task board" herein) that provides (displays) actionable tasks for addressing the detected occurrence of a life event. The association used to generate the user interface may be adaptively updated based on how the user interacts with or completes tasks for a life event to accurately reflect tasks a user performs (and any relationships between the tasks) to address a particular life event.

For example, one embodiment provides a system for providing digital assistance. The system includes at least one electronic processor configured to access data representing historical tasks performed by a user through at least one user device, determine, based on the data, a first plurality of tasks associated with a life event of the user, and store an association between the first plurality of tasks and the life event. The electronic processor is also configured to, in response to a current occurrence of the life event experienced by the user, retrieve the association and generate a user interface for display to the user, the user interface including a second plurality of tasks for addressing the current occurrence of the life event based on the first plurality of tasks.

Another embodiment provides a method of providing digital assistance. The method includes accessing first data representing historical tasks performed by a user through at least one user device, determining, based on the first data, a first plurality of related tasks, and associating the first plurality of related tasks to a life event of the user. The method further includes accessing second data representing a second plurality of tasks performed by an average user to address the life event, and storing an association between the first plurality of related tasks, the second plurality of tasks, and the life event. In addition, the method includes detecting a current occurrence of the life event experienced by the user and retrieving, with an electronic processor, the association and generating a user interface for display to the user, the user interface including a third plurality of tasks for addressing the current occurrence of the life event based on the first plurality of related tasks and the second plurality of tasks.

Yet another embodiments provides non-transitory computer readable medium storing instructions for performing, when executing, a set of functions. The set of functions includes detecting a current occurrence of a first life event experienced by a user, and displaying a first user interface to the user through a user device, wherein the first user interface includes a first plurality of tasks for addressing the current occurrence of the first life event, wherein the first plurality of tasks is based on a first plurality of historical tasks performed by the user in response to a previous occurrence of the first life event experienced by the user. The set of functions also includes, in response to user input, displaying a second user interface to the user through the user device, wherein the second user interface includes a second plurality of tasks for addressing the current occurrence of a second life event, wherein the second plurality of tasks is based on a second plurality of historical tasks performed by the user in response to a previous occurrence of the second life event experienced by the user.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention, and explain various principles and advantages of those embodiments.

DETAILED DESCRIPTION OF THE INVENTION

Before any embodiments of the invention are explained in detail, it is to be understood that the invention is not limited in its application to the details of construction and the arrangement of components set forth in the following description or illustrated in the accompanying drawings. The invention can be expressed or implemented in other embodiments.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings and can include electrical connections or couplings, whether direct or indirect. Also, electronic communications and notifications may be performed using any known means including direct connections, wireless connections, and the like.

As described above, embodiments of the invention provide systems and methods for providing personalized assistance for performing a group of related tasks that, in combination, address a life event. The personalized assistance may be based on a user's life event history and task history. For example, as described in more detail below, data may be collected that tracks activities associated with a user, including events experienced by a user (received messages) and tasks performed by a user through one or more user devices (sent messages, calendar updates, and the like). In some embodiments, this data is collected via a server and processed by the server to identify associations between a particular life event experienced by a user and tasks performed by the user to address the life event. The server may store such associations and retrieve an association when a user subsequently experiences a current occurrence of a life event. The retrieved association may be used to create a user interface that provides actionable tasks for addressing the detected occurrence of a life event.

Figure 1:
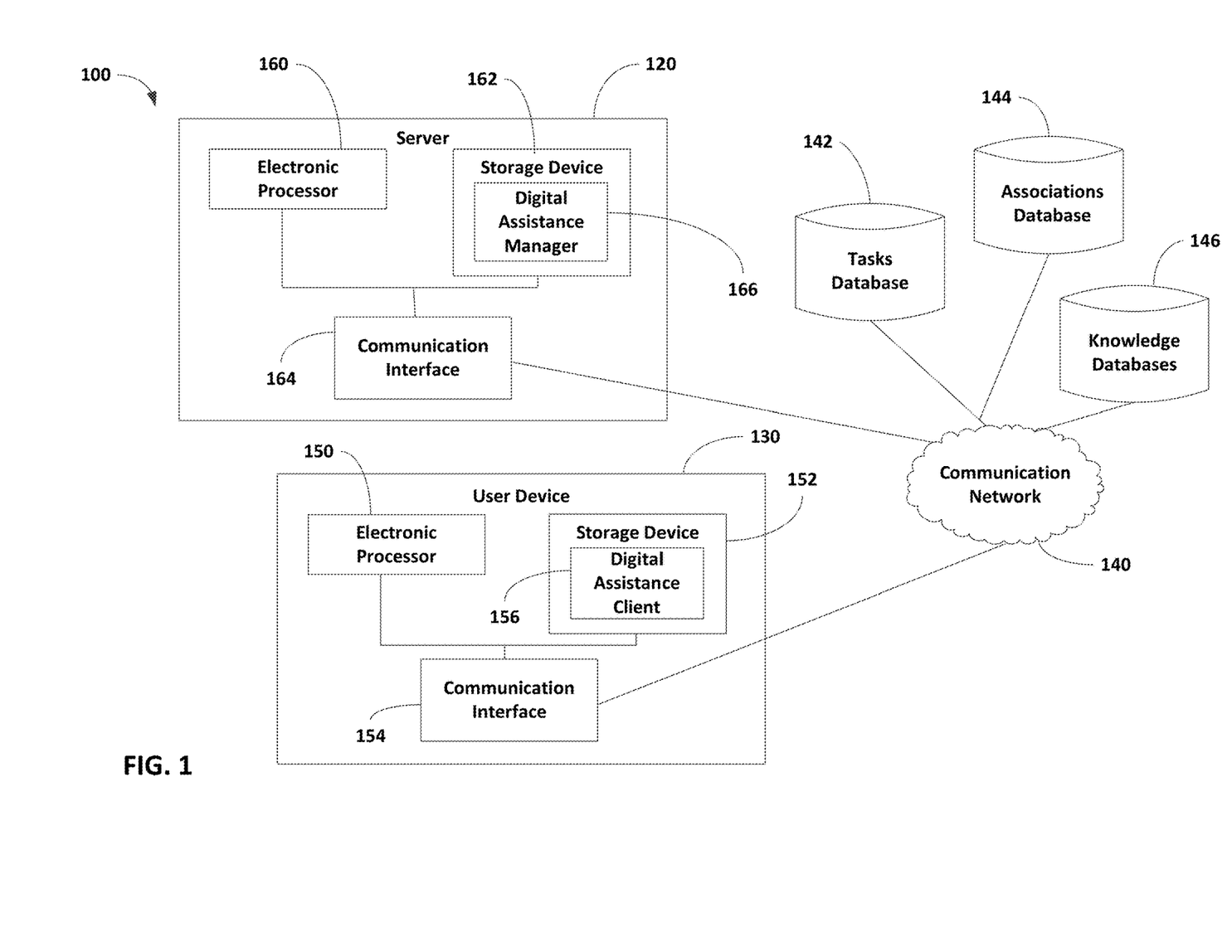
FIG. 1 is a block diagram of a system for providing personalized life event assistance according to some embodiments of the invention.

For example, FIG. 1 is a block diagram of a system 100 for performing digital assistance according to one embodiment. The system 100 may include a server 120 and a user device 130 communicating over a network 140. In some embodiments, the system 100 also includes one or more databases, such as, for example, a tasks database 142, an associations database 144, and one or more knowledge databases 146. In some embodiments, the server 120, the user device 130, or both communicate with the tasks database 142, the associations database 144, and the one or more knowledge databases 146 over the network 140. In other embodiments, the server 120, the user device 130, or both communicate with the tasks database 142, the associations database 144, and the one or more knowledge databases 146 over a separate wired or wireless connection. In still other embodiments, the tasks database 142, the associations database 144, the one or more knowledge databases 146, or a combination thereof may be included in the server 120 or combined or distributed in different configurations than as illustrated in FIG. 1. Also, FIG. 1 illustrates only one example embodiment of the system 100, and the system 100 may include additional or fewer components in configurations different from the system 100 illustrated in FIG. 1. For example, a plurality of user devices 130 may communicate with the server 120 over the network 140. Also, in some embodiments, the functionality described here as being performed by the server 120 may be distributed over multiple servers or other electronic devices.

The network 140 may be a wired or wireless communication network, such as a cellular network, a wireless network, a wired network, or the like. Portions of the network 140 may be implemented using a wide area network such as the Internet, a local area network such as a Bluetooth™ network or Wi-Fi, and combinations or derivatives thereof.

The user device 130 may be a handheld device, such as a mobile telephone, a smart telephone, a tablet computer, a smart watch or other wearable, or other electronic device configured to communicate over the network 140. For example, in some embodiments, the user device 130 may be a smart telephone carried by a user. Alternatively, the user device 130 may be a computing device, such as a personal computer, a laptop computer, a tablet computer, or the like. The user device 130 may also be a dedicated assistance device that includes a microphone and a speaker for responding to user requests for digital assistance. The user device 130 may be associated with a single user or a related group of users (for example, family members, an organization, and the like). In some embodiments, a user associated with the user device 130 may also be associated with other user devices 130. For example, a user may use and, thus, be associated with a smart watch, a mobile telephone, and a laptop, where each of these are user devices 130 as described herein.

As illustrated in FIG. 1, the user device 130 includes an electronic processor 150, a storage device 152, and a communication interface 154. The electronic processor 150, the storage device 152, and the communication interface 154 communicate over one or more communication lines or buses, wireless connections, or a combination thereof. It should be understood that, in various configurations, the user device 130 may include additional components than those illustrated in FIG. 1 and may perform additional functionality than the functionality described in the present application. For example, in some embodiments, the user device 130 includes one or more output devices, such as a display device, a speaker, or the like, and one or more input devices, such as a keypad, a touchscreen, a microphone, a camera, or the like.

The electronic processor 150 includes a microprocessor, application-specific integrated circuit (ASIC), or another suitable electronic device. The storage device 152 includes non-transitory, computer readable medium. As used in the present application, non-transitory computer-readable medium comprises all computer-readable media except for a transitory, propagating signal. Accordingly, the storage device 152 may include, for example, a hard disk, a CD-ROM, an optical storage device, a magnetic storage device, a ROM (Read Only Memory), a RAM (Random Access Memory), register memory, a processor cache, or any combination thereof. The communication interface 154 sends data to external devices or networks, receives data from external devices or networks, or a combination thereof. For example, the communication interface 154 may include a transceiver for wirelessly communicating over the network 140 and, optionally, one or more additional communication networks or connections. Additionally or alternatively, in some embodiments, the communication interface 154 includes a port for receiving a wired connection, such as an Ethernet cable, to an external device or network.

The electronic processor 150 executes instructions stored in the storage device 152. In particular, as illustrated in FIG. 1, the storage device 152 stores a digital assistance client 156. As described in more detail below, the user device 130, through execution of the digital assistance client 156 by the electronic processor 150, provides assistance to a user of the user device 130. For example, the user device 130 may provide generic suggestions or respond to specific requests as described above. To form the suggestions, the user device 130 may communicate with the server 120. For example, the user device 130 may transmit a request to the server 120 ("What restaurants are located within 20 miles from this location?," "What events are occurring Tuesday night between the hours of 8:00 p.m. and 10:00 p.m. within 10 miles from this location?"), and, in response, the server 120 may access the one or more knowledge databases 146 to generate and provide a list of suggestions. In some embodiments, the server 120 hosts one or more computer-based services, such as software applications and application programming interfaces (APIs), for responding to such requests. It should be understood that user device 130 may provide functionality other than digital assistance (for example, accessing the Internet, making and receiving voice calls, or the like) or, alternatively, may be dedicated to providing digital assistance.

In some embodiments, the user device 130 (through execution of the digital assistance client 156 or a separate software application by the electronic processor 150) also communicates with the server 120 to track tasks performed by a user associated with the user device 130. For example, as described in more detail below, the user device 130 may forward data to the server 120 that represents historical activities of the user, such as events experienced by the user through the user device 130, tasks performed by the user through the user device 130, or a combination thereof. The server 120 may store this data in the tasks database 142.

As illustrated in FIG. 1, similar to the user device 130, the server 120 includes an electronic processor 160 (for example, a microprocessor, application-specific integrated circuit (ASIC), or another suitable electronic device), a storage device 162 (for example, a non-transitory, computer-readable storage medium), and a communication interface 164, such as a transceiver, for communicating over the network 140 and, optionally, one or more additional communication networks or connections. The electronic processor 160, the storage device 162, and the communication interface 164 communicate over one or more communication lines or buses, wireless connections, or a combination thereof. It should be understood that the server 120 may include additional components than those illustrated in FIG. 1 in various configurations and may perform additional functionality than the functionality described in the present application.

The electronic processor 160 executes instructions stored in the storage device 162. In particular, as illustrated in FIG. 1, the storage device 162 stores a digital assistance manager 166. The server 120 (through execution of the digital assistance manager 166 by the electronic processor 160) responds to requests from the user device 130. For example, as described below with respect to FIG. 2, the server 120 accesses the historical data associated with a user (as stored in the tasks database 142) and generates one or more associations between sets of tasks and one or more life events, which are stored in the associations database 144. Accordingly, as also described in more detail below with respect to FIG. 2, when the server 120 subsequently detects the occurrence of a particular life event, the server 120 retrieves the stored association for the life event and generates a user interface based on the association. The user interface includes a plurality of tasks for addressing the life event. Accordingly, rather than providing a one-size-fits-all approach that provides generic suggestions or suggestions for performing a single task at one particular point in time, the server 120 provides a grouping of multiple tasks for addressing a life event.

As noted above, a life event may include may include responding to an emergency or an unexpected change in plans (for example, picking up a sick child from school or taking a family member to an unplanned medical consultation or procedure), planning for and taking a business trip, planning for and participating in a weekly team meeting, or the like. In some embodiments, a life event may be categorized as one of a plurality of types or categories of life events, such as an unplanned event, frequent event, or an infrequent event.

An unplanned life event may include a life emergency that triggers a set of tasks that need to be executed at a top priority. For example, an unplanned event may include a sick child event or a medical emergency event. In some embodiments, the server 120 identifies an unplanned life event based on one or more messages sent or received by a user through a user device.

A frequent event may include a life event that occurs at a consistent interval, such as hourly, daily, weekly, monthly, or the like. For example, tasks occurring on a particular day of the week may be associated with a life event of a work day or a particular work day of the week. In contrast, an infrequent event may occur at an inconsistent interval but may associated with a set of tasks with particular user preferences, such as business trips, personal trips, and the like. For example, when scheduling a business or a personal trip, a user may perform particular tasks that, although not necessarily occurring on a regular schedule, are commonly performed in a specific sequence or with specific preferences. In particular, after communicating with a particular business partner or client that commonly requests an on-site meeting, a user may search for flights on particular websites, book a flight with a particular airline, book a hotel within a particular brand of hotels, and, thereafter, reserve a rental car when the booked hotel does not offer a shuttle. As compared to an unplanned event, a user may have more advance knowledge of a frequent event and an infrequent event.

Figure 2:
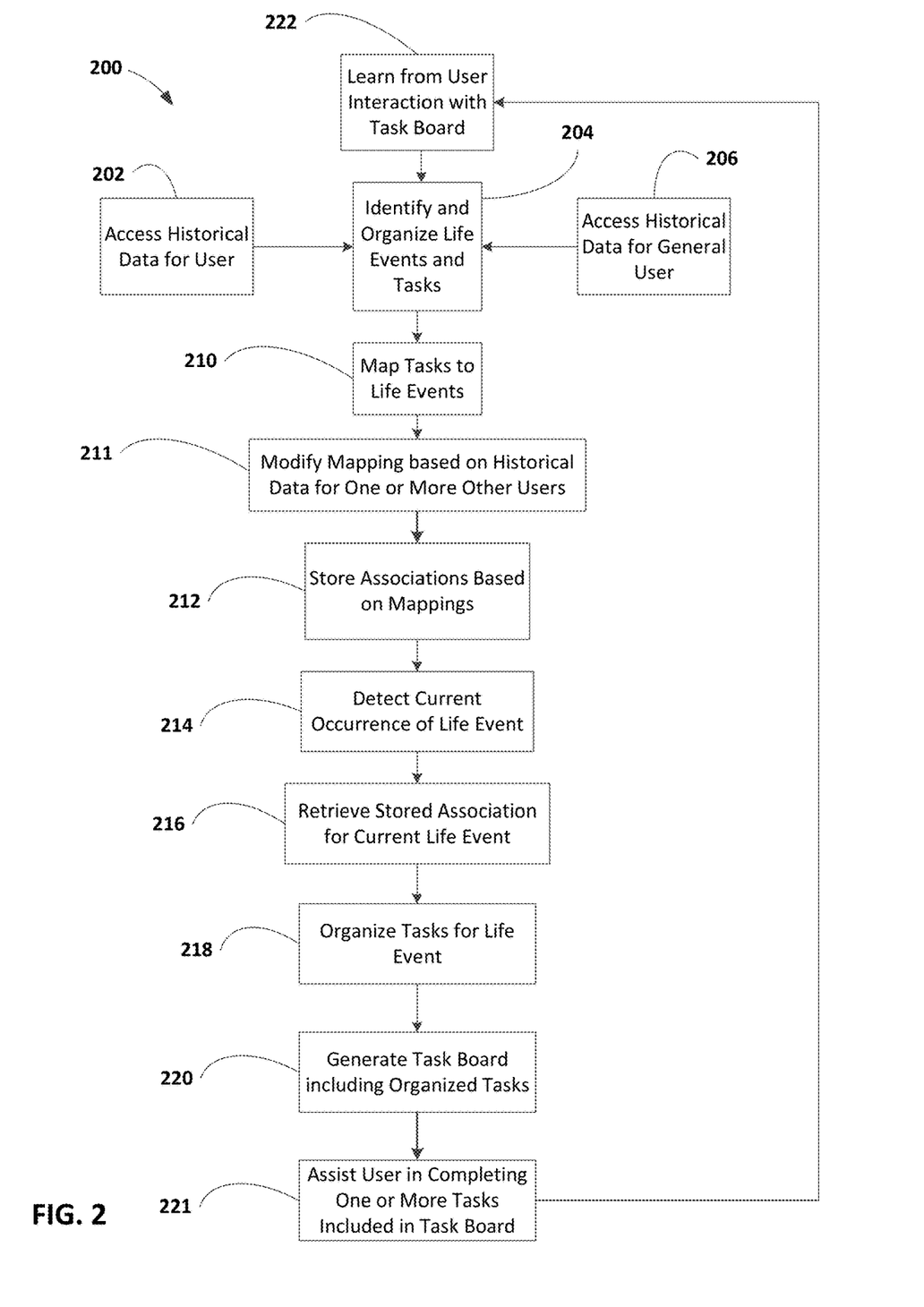
FIG. 2 illustrates a method of providing personalized life event assistance using the system of FIG. 1.

FIG. 2 illustrates a method 200 of providing personalized life event assistance using the system 100 according to one embodiment of the invention. As illustrated in FIG. 2, as part of the method 200, the server 120 accesses data representing historical tasks performed by a user through the at least one user device 130 (at block 202). This data may be stored in the tasks database 142, which may be included in the server 120 or separate from the server 120. Alternatively or in addition, in some embodiments, this data may be stored in the user device 130. In some embodiments, the server 120 initially receives the historical data from the user device 130 and forwards the data to the tasks database 142. In other embodiments, the historical data may be stored in the tasks database 142 without initially being collected by the server 120. Also, in some embodiments, an intermediate device may collect the data and forward the collected data to the server 120, the tasks database 142, or both. Also, as noted above, in some embodiments, data is collected from multiple user devices 130 that may be associated with one or more users, groups of users, or combinations thereof. Accordingly, the tasks database 142 may store data received from multiple user devices 130 associated with one or more users.

The data representing the historical tasks may identify activities performed by a user through one or more user devices or the occurrence of historical events or activities experienced by the user based on the user's interaction with one or more user devices. For example, the data may identify email messages sent, received, or both through the user device 130; short message service (SMS) messages sent, received, or both through the user device 130; location data for a user or the user device 130 (for example, geographical location data); browsing history; search history; purchase history; media viewings (for example, music played, videos played, and the like); software application usage; usage data for the user device 130 (for example, when the user device 130 is turned on or actively being used); calendar event creation and maintenance, calendar tasks and reminders creation and maintenance; data backups activity; health data logging; or the like. The data may indicate a type of activity, the user device 130 used to perform the activity, a user associated with the activity, a time-stamp for the activity, a description or subject matter of the activity, and the like.

As illustrated in FIG. 2, the server 120 (the digital assistance manager 166) may process data stored in the tasks database 142 to identify and organize life events and tasks associated with a user (at block 204). The server 120 may use machine learning, data mining, statistical analysis techniques, or a combination thereof to identify and organize the life events and tasks. For example, the server 120 may process the historical data associated with a user to identify historical life events experienced by the user. Also, in some embodiments, the server 120 may use activities associated with other users to identify life events. For example, when the user's spouse experienced a medical emergency, the server 120 may infer that the user also experienced a medical emergency. Similarly, when a user's sales team was planning for a business trip, the server 120 may infer that the user was also planning for the same business trip. Furthermore, the server 120 may infer that a user was planning for one or more generally-observed holidays.

A user may experience multiple life events at a single point in time. Accordingly, the server 120 may identify the occurrence of a historical life event and any clustering of life events. The server 120 may also rank life events such that different life events may be associated with different priorities.

Similarly, the server 120 may identify related tasks historically performed by the user by processing the historical data. In particular, the server 120 may identify that, historically, a user performs a particular type of task prior to or after another task. For example, a user may historically reserve a rental vehicle after booking a flight online. Similarly, a user may historically send an email to particular colleagues after scheduling a particular project meeting. The server 120 may use machine learning, data mining, statistical analysis techniques, or a combination thereof to identify these relationships.

As illustrated in FIG. 2, the server 120 uses the organized life event and task data to map a plurality of tasks to one or more life events (at block 210). As described in more detail below, the tasks mapped to a life event may include tasks historically performed by a user within a predetermined time period (for example, minutes, hours, or days) before, after, or concurrently with the occurrence of a particular life event.

For example, the server 120 may identify a message a user receives from a child's school clinic as representing the occurrence of the life event of a sick child. Thus, the server 120 may identify certain historical tasks routinely performed before, after, or concurrently with the occurrence of such a life event as being associated with the life event. As another example, the server 120 may identify, based on the stored historical task data, that a user historically performs a particular set of tasks every Tuesday, every Wednesday afternoon, every-other Monday, every nth day of the month, every September, or every other month. Thus, the server 120 may use the occurrence of a particular date or time to detect the occurrence of a life event and associate such a life event with the historical tasks that occur within a predetermined time period before, after, or concurrently with the particular date or time. Similarly, the server 120 may use a message from a particular business partner or client as indicating the future occurrence of a business trip and may associate such a life event with the historical tasks (for example, relating to traveling, such as searching for flight options) occurring within a predetermined time period before, after, or concurrently with such message. In each of the above examples, the server 120 may identify a task as being associated with a life event when the task satisfies particular criteria for the life event (for example, occurring within a predetermined time period before or after the life event). Similarly, the server 120 may identify a task as being associated with a life event even when the task does not satisfy the criteria for the life event when the task is related to a task that satisfies the criteria. For example, when the server 120 identifies a relationship between two tasks (for example, booking a flight and booking a car), but only one of the tasks satisfies the criteria for a life event (occurs within a predetermined time period of the life event), the server 120 may map both tasks to the life event.

It should be understood that the server 120 may organize tasks and life events and generate associated mappings in various sequences. For example, in some embodiments, the server 120 may initially identify historical life events and aggregate or cluster the identified life events and then may identify tasks associated with the identified life events.

Optionally, in some embodiments, the server 120 modifies a mapping of tasks to a life event based on historical data for one or more other users (different from the current user) (at block 211). In some embodiments, the one or more other users are other users of the digital assistance provided by the system 100 individually or aggregated to represent a population of users. For example, the server 120 may access the tasks database 142, the knowledge databases 146, or a combination thereof to obtain historical data for one or more other users (at block 206) and use the historical data to identify and organize historical tasks, life events, or both for the other users and map a plurality of tasks to one or more life events based on the organized data for the other users (referred to herein as "general mappings") as described above (at blocks 204 and 210). The server 120 may be configured to compare a current user's mapping with one or more general mappings for the same life event. When a general mapping includes one or more additional tasks not included in the user's mapping, the server 120 may modify the user's mapping to include additional tasks as included in the general mapping. Similarly, when a general mapping includes a particular relationship between tasks that is not included in the user's mapping, the server 120 may modify the user's mapping accordingly. For example, as part of a general mapping, the server 120 may determine that, when preparing for a personal vacation, a general user commonly sets an out-of-office reply for their email, sends an email to their assistant, and alerts their credit card company of their upcoming travel. When the current user's mapping does not include the final alert to the credit card company, the server 120 may add this task to the user's mapping.

Alternatively or in addition, the server 120 may be configured to manually display a general mapping or a portion thereof to the user and prompt the user to confirm modification of his or her mapping to match the general mapping or a portion thereof. The general mappings may provide new ways to address a life event as compared to the user's historical tasks, which the user may consider to address a life event more efficiently, accurately, or thoroughly. Thus, the general mapping may provide suggestions for improving how the current user addresses a particular life event.

In some embodiments, the server 120 determines general mappings for a plurality of user types, such as a business user, a personal user, a student user, a senior citizen user, and the like. Accordingly, the server 120 may be configured to determine a type of the current user and compare the current user's mappings with general mappings generated for the same type of user. Also or in addition, in some embodiments, the server 120 may display available user types (optionally along with characteristics that define each type of user) and allow a user to select one or more of the user types. The server 120 may then use the selected user types to identify applicable general mappings for comparing with the user's mappings.

The server 120 may also rank life events, tasks mapped to a life event, or a combination thereof and, thereafter, may perform task aggregation to group related tasks or identify other sub-grouping of tasks. In some embodiments, the server 120 may rank individually tasks mapped to a particular life event to order tasks based on priority. The server 120 may also rank groups of tasks based on priority. Similarly, in some embodiments, the server 120 may rank life events based on priority. For example, a life event categorized as an unplanned event may be assigned a higher priority than a life event categorized as a frequent event or an infrequent event. The server 120 may use the rank assigned to a life event to determine, when a multiple life events are occurring at overlapping times, what life events should be addressed before other life events.

In some embodiments, a user of the system 100 may configure the server 120 (for example, through a user interface provided through the system 100) to map tasks for particular types of life events and not other types of life events. For example, a user may request that the server 120 map tasks for life events categorized as frequent events but not life events categorized as unplanned or infrequent events. Similarly, in some embodiments, a user may be able to configure the system 100 by specifying parameters for when the server 120 maps tasks to a particular life event (for example, when the life event is associated with more than five tasks, when the life event has occurred more than ten times in the past six months, and the like).

The mappings identified by the server 120 represent an association between a set of tasks and a particular life event that the server 120 stores (at block 212). In some embodiments, the server 120 stores such associations in the associations database 144. The association may be a set or listing of data, such as an identifier of a life event, a collection or grouping of associated tasks, and an identifier of any relationships between the associated tasks. The relationship identifiers may identify whether a task should be (for efficiency purposes) performed before or after other tasks, whether a task has a higher or lower priority over other tasks, and the like. The relationship identifiers may also identify what tasks are essential and what tasks are optional. Similarly, the relationship identifiers may identify whether a task was mapped to a life event based on the current user's historical data or based on historical data for one or more other users as described above. Alternatively or in addition, the association may include a graph that maps the associated tasks, including any relationships, to the life event. The task graph may also represent any relationships (including conditional relationships) between the tasks associated with a life event (for example, when task A is performed, task B may be also performed but when task A is not performed then task C may be performed). For example, the task graph may represent whether a particular task should be performed before or after other tasks, or a particular suggested order of tasks, and the like. Accordingly, the task graph may graphically define a relationship between a life event and a plurality of tasks as well as any relationships between any of the plurality of tasks.

As illustrated in FIG. 2, after storing the associations in the associations database 144 (at block 212), the server 120 subsequently detects when a user experiences a current occurrence of a life event (at block 214). As noted above, when mapping tasks to a particular life event, the server 120 may identify a life event by one or more activities associated with a user or another user (for example, messages received, messages sent, calendar entries, upcoming holidays, or the like). For example, the server 120 may identify the occurrence of a life event when a user receives a message from or generates a message to a particular individual or address, receives or generates a message with a particular subject line, performs a particular online search, performs a particular online activity, uses of a particular software application, adds, deletes, or modifies a calendar event, is present (the user or a user device 130 associated with the user) at a particular geographical location, and the like. Accordingly, the server 120 may identify when a user experiences a life event by monitoring the activities of a user or a user device 130 associated with the user or a related user.

When the server 120 identifies the occurrence of a life event (at block 214), the server 120 retrieves an association, such as a task graph, for the currently occurring life event from the associations database 144 (at block 216). The server 120 uses the association to generate a user interface that is displayed to the user (at block 218).

The user interface provides the suggested tasks for addressing the current life event as a graph, sequence, matrix, or the like. The suggested tasks may be ranked as specified in the association. Also, in some embodiments, depending on the number of or relationships of the tasks associated with the life event, the server 120 may identify a subset of the tasks to initially include in the user interface. For example, to avoid overwhelming the user, the server 120 may limit the number of tasks initially included in the user interface. Similarly, when a life event is associated with multiple sub-sets of tasks, the server 120 may initially provide one sub-set of tasks (a priority or critical sub-set). Alternatively, the user interface may include all of the tasks associated with the life event based on the stored association. Optionally, the user interface may also indicate relationships between the tasks included in the user interface, such as whether a particular task should be performed before or after other tasks. Similarly, in some embodiments, the server 120 may aggregate tasks included in the user interface or break-down a task into multiple sub-tasks. In general, the user interface may organize tasks by relevance (how often the task is performed for a life event), criticality (how important a task is for a life event), priority (an order of performance of a task), duration (how long a task takes to complete), or a combination thereof. This information may be included in the stored association (as a relationship between tasks), based on data stored in one or more of the knowledge databases 146 (associated with a user or an average user), or a combination thereof. Tasks included in the user interface may also be displayed differently (displayed in different colors, animations, fonts, and the like) based on one or more characteristics. For example, critical or high priority tasks may be displayed differently than optional or lower priority tasks. Similarly, a task suggested based on historical data for a user may be displayed differently than a task suggested based on historical data for a general user as described above.

In some embodiments, the server 120 also accesses one or more of the knowledge databases 146 to supplement data included in the user interface. For example, when the server 120 detects a future business trip and the associated for such an event includes the task, among other tasks, of searching for available flights, the server 120 may access current flight availability information obtained from one or more of the knowledge databases 146 for inclusion in the user interface. Alternatively or in addition, as described below, the server 120 may include a link in the user interface that a user may select to access additional information associated with a displayed task.

After generating the user interface for addressing the detected life event, the server 120 outputs the user interface to the user through the user device 130 or other electronic device associated with the user (at block 220). For example, the server 120 may transmit the user interface to the user device 130 over the network 140. The server 120 then provides assistance to the user in completing one or more of the tasks included in the user interface based on user input received through the user interface (at block 221).

Figure 3A:
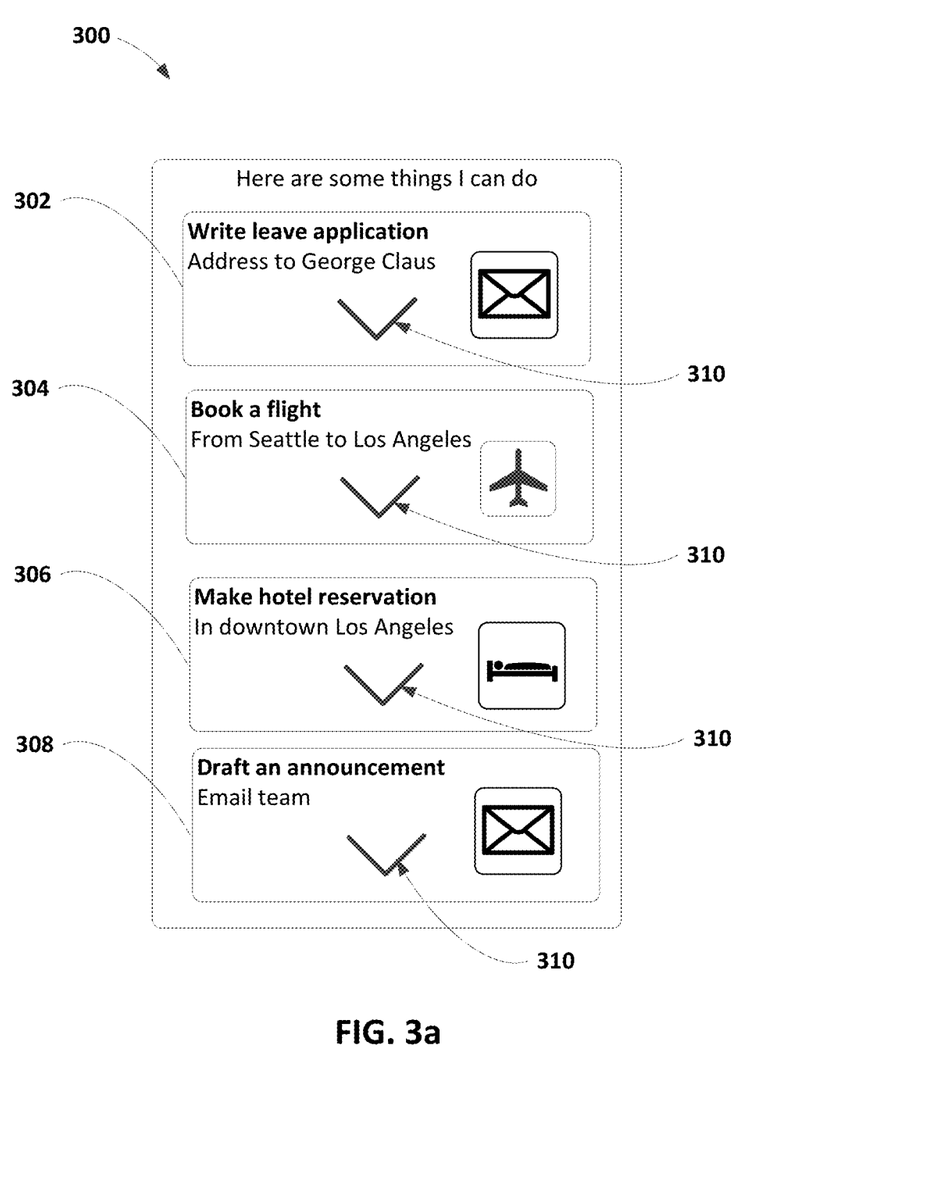
FIGS. 3a through 3e illustrate example task boards generated by the system of FIG. 1 according to some embodiments of the invention.

For example, FIG. 3a illustrates one example of a user interface, referred to as a task board 300 herein. As illustrated in FIG. 3a, the task board 300 presents a plurality of applicable tasks to the user that may be completed by the user to address a detected life event. In some embodiments, the task board 300 displays the plurality of tasks in an order that represents a recommended sequence for completing the plurality of tasks. For example, the example task board 300 illustrated in FIG. 3a includes a plurality of icons or windows wherein each window corresponds to suggested tasks for addressing a life event. For example, the example task board 300 includes a leave request window 302 associated with the task of writing or submitting a leave application or request, a transportation window 304 associated with the task of booking a flight or other mode of transportation, a lodging window 306 associated with the task of reserving a hotel room or other accommodations, and an announcement window 308 associated with the task of drafting an announcement to the user's family, team, or other recipient. Each task window 302, 304, 306, and 308 may include an accept selection mechanism 310 selectable by the user to authorize the digital assistance client 156 to automatically perform the task or a portion thereof or to obtain additional information regarding the task associated with the icon. As noted above, the order of the windows 302, 304, 306, and 308 included in the task board 300 may represent a recommended sequence for completing the suggested tasks (for example, request leave before booking a flight).

Figure 3B:
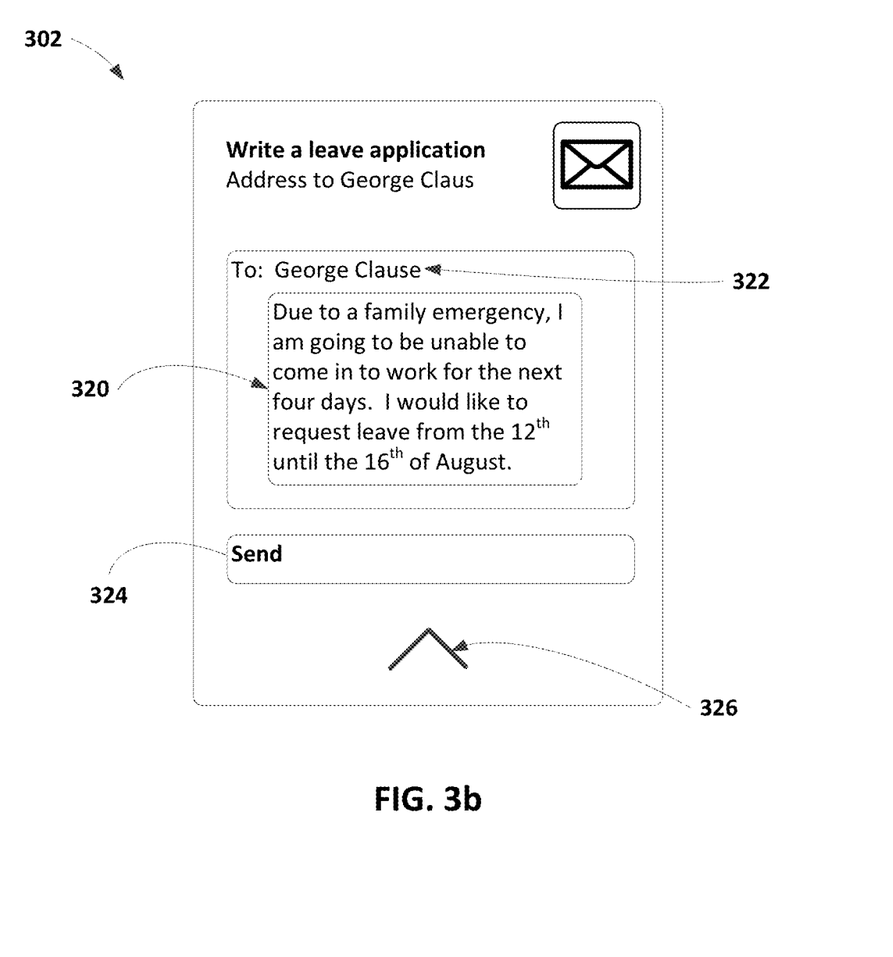

When the user selects the accept selection mechanism 310 associated with the leave request window 302, the leave request window 302 may expand and display a draft message 320 (for example, an email message) to one or more predetermined recipients 322 that requests time off of work as illustrated in FIG. 3b. The draft message 320, the predetermined recipients 322, or both may be included in the stored association for the particular life event. Alternatively or in addition, the server 120, the user device 130, or both may access data separate from the stored association (for example, included in the one or more knowledge databases 146, a company's leave policy or procedure documentation, the user's contact directory, or the like) to prepare the draft message 320, the predetermined recipients 322, or both. In some embodiments, the user may update the draft message 320, the predetermined recipients 322, or both. However, when the user approves of the draft message 320 and the predetermined recipients 322, the user may select a send selection mechanism 324 that authorizes the digital assistance client 156 to send the draft message 320 to the predetermined recipients 322. As illustrated in FIG. 3b, in some embodiments, the leave request window 302 also includes a close selection mechanism 326 that allows the user to minimize the leave request window 302, such as to return the leave request window 302 to the form illustrated in FIG. 3a.

Figure 3C:
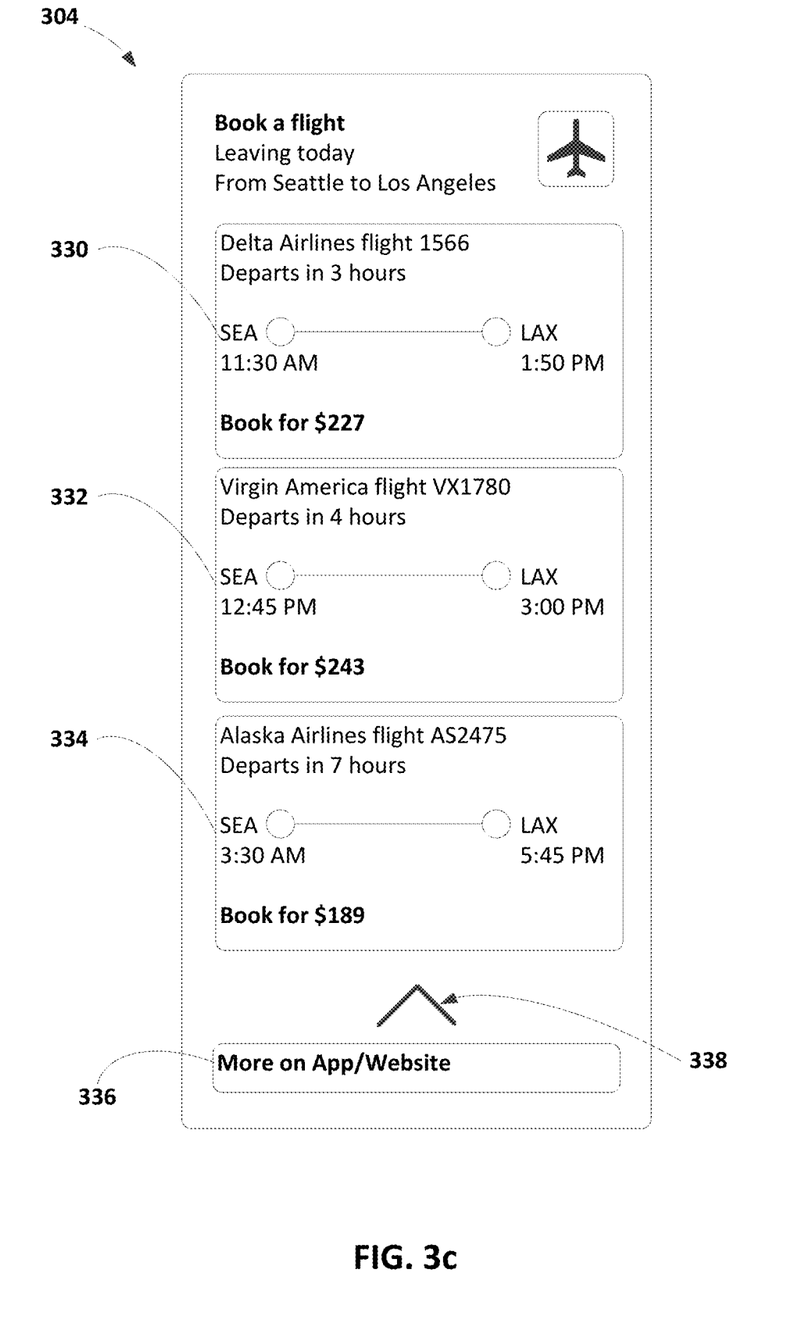

Similarly, when the user selects the accept selection mechanism 310 associated with the transportation window 304, the transportation window 304 may expand and display one or more transportation options 330, 332, and 334 as illustrated in FIG. 3c. When the transportation options 330, 332, and 334 include flight options, each option may list, among other information, an airline carrier, departure and arrival time, price, or a combination thereof. In some embodiments, the flight options may be personalized based on preferences of the user, such as preferred airports, airline carriers, travel times, or the like. These preferences may be stored in the association and may be manually set or automatically learned. It should be understood that the transportation options may include other modes of transportation (for example, taxi, limo, train, subway, ferry, bus, and the like) including a combination of different modes of transportation. As noted above, the current information regarding the transportation options 330, 332, and 334 may be accessed from the one or more knowledge databases 146. Alternatively or in addition, the current information regarding the transportation options 330, 332, and 334 may be accessed from one or more websites or software applications, such as a travel or transportation application commonly used by the user through the user device 130. As illustrated in FIG. 3c, in some embodiments, the transportation window 304 may also include a more selection mechanism 336 that allows a user to view additional options, such as options available through one or more websites or software applications, including, for example, websites or software applications historically used by the user to obtain transportation information. The user can select one of the displayed transportation options 330, 332, or 334 to authorize the digital assistance client 156 to book the selected transportation. As illustrated in FIG. 3c, in some embodiments, the transportation window 304 also includes a close selection mechanism 338 that allows the user to minimize the transportation window 304, such as to return the transportation window 304 to the form illustrated in FIG. 3a.

Figure 3D:
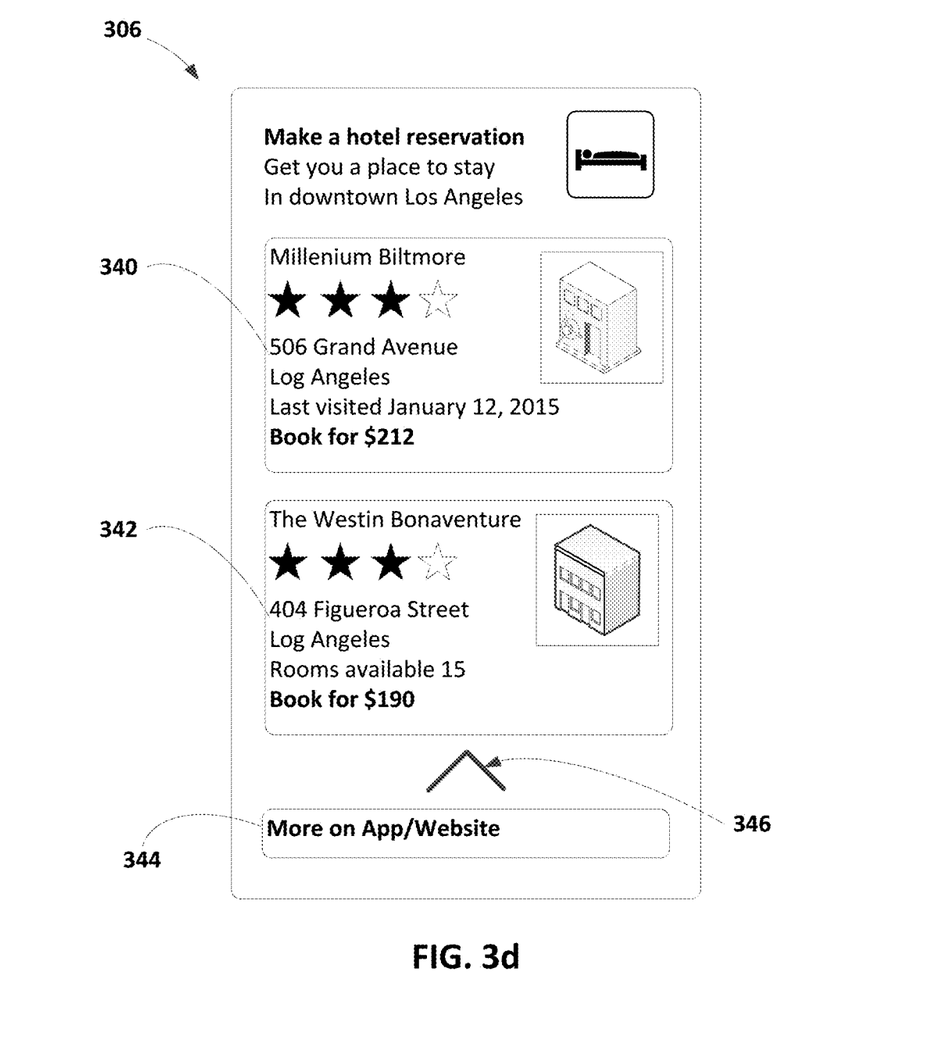

As illustrated in FIG. 3d, when the user selects the accept selection mechanism 310 associated with the lodging window 306, the lodging window 306 may expand and display one or more lodging options 340 and 342. Each lodging option 340 and 342 may list, among other information, an establishment name or brand, an address, a ranking, an availability, a price or pricing options, a date of last visit, or a combination thereof. Each lodging option 340 and 342 may also include one or more images of the lodging option. As noted above, the information regarding the lodging options 340 and 342 may be based on user preferences and may be accessed from the one or more knowledge databases 146. Alternatively or in addition, the information regarding the lodging options 340 and 342 may be accessed from one or more websites or software applications, such as a travel application commonly used by the user through the user device 130. As illustrated in FIG. 3d, in some embodiments, the lodging window 306 may also include a more selection mechanism 344 that allow a user to view additional lodging options, such as options available through one or more websites or software applications, including, for example, websites or software applications historically used by the client to obtain lodging information. The user can select one of the displayed lodging options 340 and 342 to authorize the digital assistance client 156 to make a reservation at the selected lodging option. As illustrated in FIG. 3d, in some embodiments, the lodging window 306 also includes a close selection mechanism 346 that allows the user to minimize the lodging window 306, such as to return the lodging window 306 to the form illustrated in FIG. 3a.

Figure 3E:
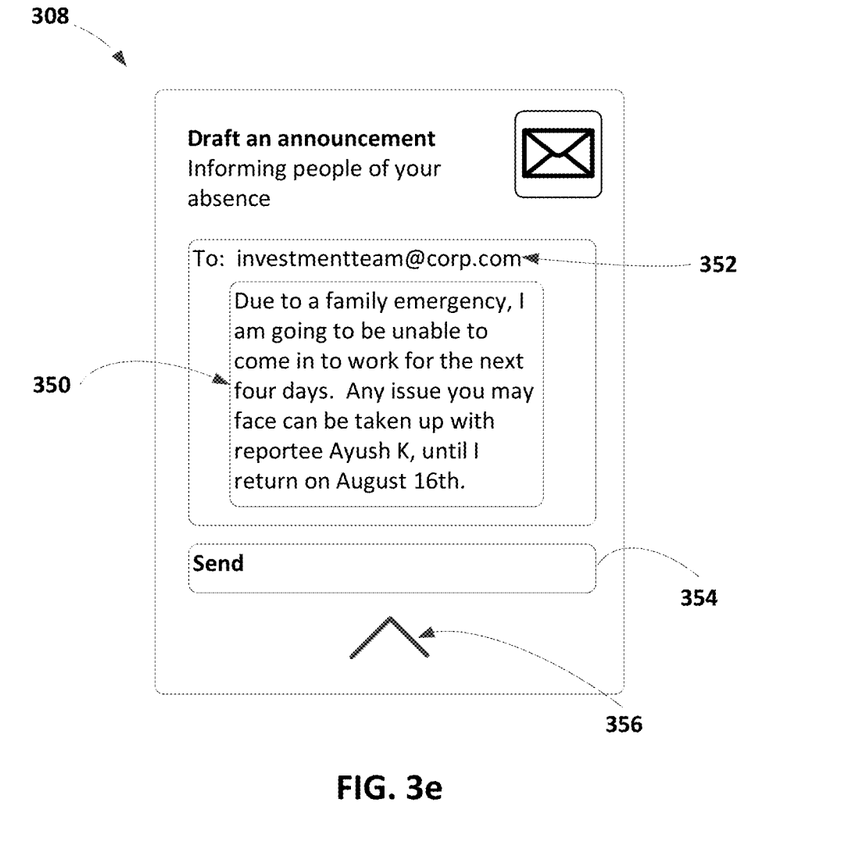

Similar to the leave request window 302, when the user selects the accept selection mechanism 310 associated with the announcement window 308, the announcement window 308 may expand to display a draft message 350 (for example, an email message) to one or more predetermined recipients 352 that informs the one or more predetermined recipients of the user's absence as illustrated in FIG. 3e. The draft message 350, the predetermined recipients 352, or both may be included the stored associated for the example leave of absence unplanned life event. Alternatively or in addition, the server 120, the user device 130, or both may access data separate from the stored association (for example, included in the one or more knowledge databases 146, a company's leave policy or procedure documentation, the user's contact directory, or the like) to prepare the draft message 350, the predetermined recipients 352, or both. In some embodiments, the user can update the draft message 350, the predetermined recipients 352, or both. However, when the user approves of the draft message 350 and the predetermined recipients 352, the user may select a send selection mechanism 354 that authorizes the digital assistance client 156 to send the draft message 350 to the predetermined recipients 352. As illustrated in FIG. 3e, in some embodiments, the announcement window 308 also includes a close selection mechanism 356 that allows the user to minimize the announcement window 308, such as to return the announcement window 308 to the form illustrated in FIG. 3a.

It should be understood that, in some embodiments, to perform a task authorized by the user, the digital assistance client 156 may hand-off data to a separate software application or component. For example, to book a flight selected by the user through the transportation window 304, the digital assistance client 156 may forward information to a travel application that performs the booking. Similarly, to compose a message, the digital assistance client 156 may forward information to a message composition application, such as an email application, that allows the user to approve or edit them message in a familiar environment. In some embodiments, a user can configure (through a user interface provided through the system 100) the digital assistance to perform particular tasks directly or through a hand-off.

Also, as a user completes (or closes or disregards) particular tasks through the task board 300, the digital assistance client 156 may update the task board 300 with one or more new tasks, such as new task sub-graphs. For example, the completion of a task sub-graph may lead to other sub-graphs, other task graphs, and so on. In other words, a task graph or sub-graph may be extended into multiple task sub-graphs where each sub-graph leads to a child sub-graph and each child sub-graph may lead to further descendants through the same or additional life events. Also, it should be understood that the task board 300 illustrated in FIGS. 3a through 3e represent one example of a user interface generated based on a stored association and the user interface may include different types or structures of data including two-dimensional structures, three-dimensional structures, textual data, graphical data, and the like. For example, the user interface may display a grouping of tasks on a timeline, within a flowchart, and the like.

In addition, it should be understood that a user may experience a plurality of a life events concurrently, and the server 120 may generate a separate user interface for each life event (for example, having a one-to-one correspondence to a user event). To handle such a situation, the server 120 may allow a user to switch between user interfaces for multiple, concurrent life events. For example, when multiple user interfaces exist for multiple life events, the user device 130 may display a switch selection mechanism selectable by the user to switch between a currently-displayed user interface and another available user interface. In particular, when the user selects the switch selection mechanism, the user device 130 may display (for example, through a drop down window or other mechanism) available user interfaces and allow a user to select one of the available user interface for display. Alternatively or in addition, the user device 130 may allow a user to select multiple user interfaces for concurrent display (in an overlapping, partially-overlapping, or non-overlapping format). Also, in some embodiments, the user device 130 may be configured to automatically switch the displayed user interface based on context, such as based on a current time of day, a current task being performed by the user, and the like. Furthermore, in some embodiments, the user device 130 may be configured to rank or prioritize available user interfaces or tasks included in individual user interfaces based on relevance, severity, expected duration, and the like. Also, in some embodiments, similar to how the server 120 maps tasks to a life event, the server 120 may map a set of concurrent or overlapping life events to an overreaching life event. The overreaching life event may be mapped to a consolidated group of tasks. Accordingly, in this situation, the server 120 may replace multiple user interfaces with a single user interface for the overreaching life event.

Furthermore, as illustrated in FIG. 2, the server 120 may learn from the user's interaction with displayed tasks within a user interface to further adapt or customize the stored associations (for example, stored as task graphs) for the user (as a feedback, closed-loop system) (at block 222). For example, when a user repeatedly does not authorize or execute a particular task included in a user interface over time, the server 120 may adapt the stored association used to generate the user interface accordingly. For example, the server 120 may adjust the priority or rank of a particular task overtime based on whether the user requests assistance for a particular task or whether the user requests assistance for a task before or after other tasks. This interaction may be also be used by the server 120 as source of additional life events. For example, when a user completes a particular task or subset of tasks included in a user interface (optionally, in a particular order), the server 120 may identify a new life event and may generate a new user interface accordingly. Similarly, the server 120 may continue to access historical task data for a user or a general user or group of users to further automatically refine existing associations, create new associations, or both. In addition, in some embodiments, the server 120 allows a user to manually edit a stored association to remove tasks included in an association, modify relationships between tasks included in an association, add tasks to an association, or a combination thereof.

Figure 4:
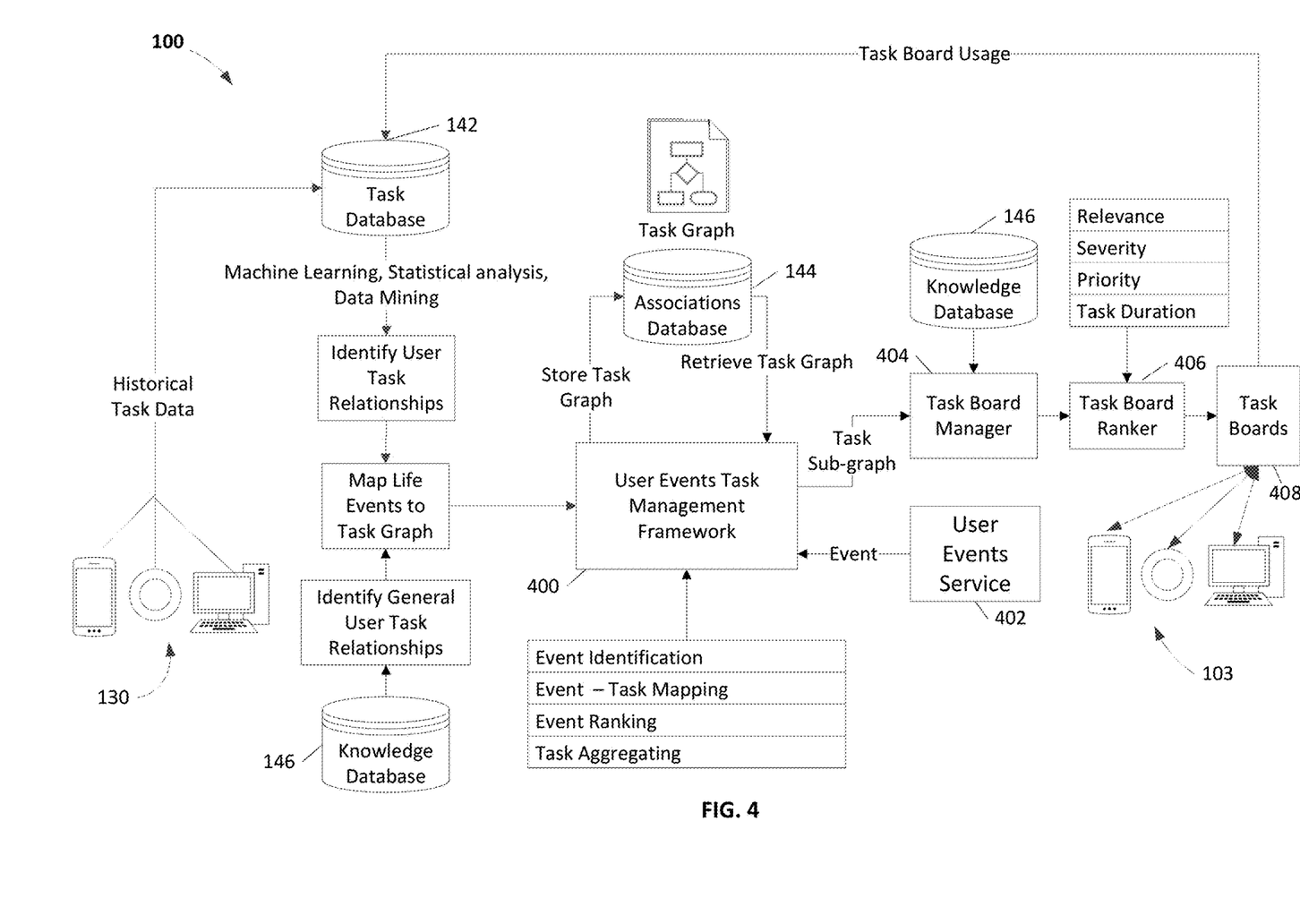
FIG. 4 schematically illustrates one implementation of the system of FIG. 1 according to some embodiments of the invention.

It should be understood that the functionality described above may be combined and distributed in various configurations. For example, FIG. 4 represents one example implementation of the system 100 where different software components (executed by one or more electronic processors on one or more electronic devices) control particular aspects of the functionality described above. In particular, as illustrated in FIG. 4, a user events task management framework 400 may manage task graphs stored to the associations database 144, which may be generated as described above by identifying user tasks relationships and general task relationships (based on historical task data stored in the tasks database 142 and data stored in the knowledge databases 146). As illustrated in FIG. 4, the user events task management framework 400 may also be configured to perform life event identification or conflation, task mapping to life events, event ranking, and task aggregation.

As illustrated in FIG. 4, a user events service 402 may detect life events experienced by a user based on tasks or events performed by a user through a user device 130, or data, notifications, emails, phone calls, and the like received by the user through a user device, or general time-based triggers, such as the generation or receipt of predetermined messages associated with predetermined recipients or sources or the occurrence of a predetermined time (for example, 3:00 p.m., Tuesday, holiday, business trip, $1^{st}$ of May, and the like). The user events service 402 may report each life event to the user events task management framework 400, and, in response, the user events task management framework 400 may retrieve the appropriate task graph from the associations databases 144. Based on the retrieved task graph, the user events task management framework 400 identifies a task sub-graph, which is passed to a task board manager 404. The task board manager 404 generates a user interface (a task board) based on the received task sub-graph and may retrieve relevant information for the task board from the knowledge databases 146, such as current flight options, current hotel prices and availability, current weather conditions, and the like.

The task board manager 404 forwards the generated task board to a task board ranker 406 that ranks the task board based on relevance, severity, priority, task duration, or a combination thereof to identify which task board 408 (or task boards 408) should be displayed to the user through the user device 130 from multiple available tasks boards. In some embodiments, each of the user events task management framework 400, the user events service 402, the task board manager 404, and the task board ranker 406 may be executed by the electronic processor 160 included in the server 120.

It should also be understood that all or a portion of the functionality described above as being performed by the server 120 (through the digital assistance manager 166 or a separate software application) may be performed locally by the user device (through the digital assistance client 156 or a separate software application). For example, in some embodiments, the user device 130, through execution of the digital assistance client 156 by the electronic processor 150, may access a task graph from the associations database 144 after detecting a life event (through the server 120 or directly) and generate a user interface locally.

Thus, rather than providing digital assistance that is limited to staggered, independent, recommendations for an individual task, embodiments of the invention provide recommendations for multiple related tasks for addressing a user's life event that is personalized to the user. The recommendations may be presented within a single interface (a task board) such that a user can access one interface to find suggested tasks for addressing a life event along with current information for completing these tasks (for example, current flight options, current weather information, and the like). Rather than providing a static or rules-based recommendation for task completion as performed by existing digital assistants, the user interface described herein is based on machine learning models using knowledge of individual user behavior and, optionally, learning models using knowledge from other users including groups of users. The user interface is automatically generated based on inferred life events that may be detected based on information from various sources, including but not limited to email messages, short message service messages, calendars, and the like and may be personalized to the user's interest and current context. Furthermore, the associations between tasks and life events may be automatically updated based on the user's interaction with the interface or other activities or may be manually updated by the user. A user may also complete tasks included in the user interface through the digital assistant application, through a third-party software application or website (a user's favorite websites or software applications) accessible through the interface, or a combination thereof.

Various features and advantages of some embodiments are set forth in the following claims.

What is claimed is:

1. A system for providing digital assistance, the system comprising:
    at least one electronic processor configured to:
        access historical task data that identifies activities performed by a user through at least one user device, the historical task data comprising:
            a type of activity performed on the at least one device;
            an identifier for the user associated with the activity; and
            a time stamp for the activity;
        determine, based on the historical task data, a first life event experienced by the user and a first plurality of tasks performed via the at least one user device that addressed the first life event;
        store a first association between the first plurality of tasks and the first life event;
        in response to detecting a current occurrence of the first life event experienced by the user:

retrieve the first association;
derive a second plurality of tasks for addressing the current occurrence of the first life event based on the first plurality of tasks;
generate a first user interface that presents a subset of the second plurality of tasks for addressing the current occurrence of the first life event, each task in the subset having an associated selection mechanism, selection of which initiates automatic performance of at least a portion of the associated task;
generate a second user interface comprising a third plurality of tasks for addressing a current occurrence of a second life event, wherein the third plurality of tasks is based on a fourth plurality of tasks performed by the user in response to a previous occurrence of the second life event experienced by the user; and
automatically merge the first user interface and the second user interface to generate a third user interface based on a stored mapping associating the first life event and the second life event with an overreaching life event, wherein the third user interface comprises the subset of the second plurality of tasks and the third plurality of tasks.

2. The system of claim 1, wherein the at least one electronic processor is included in the at least one user device.

3. The system of claim 1, wherein the at least one electronic processor is further configured to transmit the third user interface to the at least one user device over at least one network.

4. The system of claim 1, wherein the subset of the second plurality of tasks included in the first user interface includes the first plurality of tasks.

5. The system of claim 1, wherein the at least one electronic processor is further configured to
identify at least one relationship between at least two tasks included in the first plurality of tasks based on the historical task data, and wherein the second plurality of tasks for addressing the current occurrence of the first life event is based on the first plurality of tasks and the at least one relationship.

6. The system of claim 5, wherein the first association includes a task graph including the first plurality of tasks based on the at least one relationship.

7. The system of claim 1, wherein the at least one electronic processor is further configured to receive feedback from the user for the first user interface and update the first plurality of tasks based on the feedback.

8. The system of claim 1, wherein the first association comprises an identifier of a relationship between two tasks of the first plurality of tasks, the identifier comprising at least one of:
an identification of an order of performance of the two tasks; and
a priority for the two tasks.

9. The system of claim 1, wherein the at least one electronic processor is further configured to:
responsive to selection of a selection mechanism associated with a task of the subset of the second plurality of tasks:
retrieve additional information related to the task; and
present the additional information in the third user interface.

10. The system of claim 1, wherein the at least one electronic processor is further configured to access second historical task data that identifies second activities performed by at least one second user, and wherein determining the first plurality of tasks includes determining the first plurality of tasks based on the historical task data and the second historical task data.

11. The system of claim 1, wherein the at least one electronic processor is further configured to:
monitor a set of additional tasks performed by the user through the at least one device.

12. The system of claim 1, wherein detecting the current occurrence of the first life event experienced by the user includes detecting an occurrence of a predetermined time, or detecting a predetermined message, or both.

13. A method of providing digital assistance, the method comprising:
accessing historical task data that identifies activities performed by a user through at least one user device, the historical task data comprising:
a type of activity performed on the at least one device;
an identifier for the user associated with the activity; and
a time stamp for the activity;
determining, based on the historical task data, a first life event experienced by the user and a first plurality of related tasks associated with the first life event;
storing a first association between the first plurality of related tasks and the first life event;
detecting a current occurrence of the first life event experienced by the user;
retrieving the first association in response to detecting the current occurrence of the first life event experienced by the user;
deriving a second plurality of tasks for addressing the current occurrence of the first life event based on the first plurality of related tasks;
generating a first user interface that presents a subset of the second plurality of tasks for addressing the current occurrence of the first life event, each task in the subset having an associated selection mechanism, selection of which initiates automatic performance of at least a portion of the associated task;
generating a second user interface comprising a third plurality of tasks for addressing a current occurrence of a second life event, wherein the third plurality of tasks is based on a fourth plurality of tasks performed by the user in response to a previous occurrence of the second life event experienced by the user; and
automatically merging the first user interface and the second user interface to generate a third user interface based on a stored mapping associating the first life event and the second life event with an overreaching life event, wherein the third user interface comprises the subset of the second plurality of tasks and the third plurality of tasks.

14. The method of claim 13, further comprising transmitting, with the electronic processor, the third user interface to the at least one user device.

15. The method of claim 13, wherein storing the first association includes generating and storing a task graph for the first life event based on the first plurality of related tasks.

16. The method of claim 13, further comprising
receiving feedback from the user through the third user interface; and
updating the first association based on the feedback.

17. The method of claim 13, wherein detecting the current occurrence of the first life event experienced by the user includes detecting an occurrence of a predetermined time, or detecting a predetermined message, or both.

18. A non-transitory computer readable medium storing instructions for performing, by a processor, a set of functions, the set of functions comprising:
- receiving historical task data that identifies activities performed by a user through at least one user device, the historical data comprising:
  - a type of activity performed on the at least one device;
  - an identifier for the user associated with the activity; and
  - a time stamp for the activity;
- determining, based on the historical task data, a first life event experienced by the user and a first plurality of tasks associated with the first life event;
- storing a first association between the first plurality of tasks and the first life event;
- detecting a current occurrence of the first life event experienced by the user;
- responsive to detecting the current occurrence of the first life event:
  - retrieving the first association;
  - deriving a second plurality of tasks for addressing the current occurrence of the first life event based on the first plurality of tasks;
  - generating a first user interface comprising a subset of the second plurality of tasks for addressing the current occurrence of the first life event, each task in the subset having an associated selection mechanism, selection of which initiates automatic performance of at least a portion of the associated task;
- generating a second user interface comprising a third plurality of tasks for addressing a current occurrence of a second life event, wherein the third plurality of tasks is based on a fourth plurality of tasks performed by the user in response to a previous occurrence of the second life event experienced by the user; and
- automatically merging the first user interface and the second user interface to generate a third user interface based on a stored mapping associating the first life event and the second life event with an overreaching life event, wherein the third user interface comprises the subset of the second plurality of tasks and the third plurality of tasks.

19. The non-transitory computer readable medium of claim 18, wherein detecting the current occurrence of the first life event includes detecting an occurrence of a predetermined time, or detecting a predetermined message, or both.

20. The non-transitory computer readable medium of claim 18, the set of functions further comprising:
- transmitting the third user interface to the at least one user device over at least one network.

* * * * *